United States Patent
Kelsey

[15] 3,665,224
[45] May 23, 1972

[54] AMBIENT LIGHT LEVEL DETECTOR INCLUDING TRANSIENT SUPPRESSION CIRCUITRY

[72] Inventor: Newton D. Kelsey, Houston, Tex.
[73] Assignee: Arthur P. Ruth
[22] Filed: Sept. 8, 1970
[21] Appl. No.: 70,025

[52] U.S. Cl. ............................. 307/311, 307/273, 307/235, 307/236, 250/215
[51] Int. Cl. ........................................... H01j 39/12
[58] Field of Search ............... 307/273, 236, 262, 311, 235; 317/148.5; 250/215

[56] References Cited

UNITED STATES PATENTS

| | | | |
|---|---|---|---|
| 3,313,939 | 4/1967 | Spencer | 307/311 |
| 3,175,152 | 3/1965 | Shafer | 307/311 |
| 3,315,134 | 4/1967 | Scholl | 317/148.5 |
| 2,879,456 | 3/1959 | Pinckaers | 307/311 |
| 3,238,423 | 3/1966 | Giuffrida | 317/148.5 |
| 3,221,317 | 11/1965 | Ferrigno | 307/311 |

*Primary Examiner*—Donald D. Forrer
*Assistant Examiner*—Harold A. Dixon
*Attorney*—Donald Gunn

[57] ABSTRACT

A circuit which includes a level detector circuit which is operated at two output levels, one level being indicative of a first ambient light condition and the second being indicative of another light condition, therebeing a timing circuit operated by the Schmitt trigger and an output circuit operated by the timing circuit after a predetermined delay to overcome transient and temporary changes in ambient light.

2 Claims, 1 Drawing Figure

PATENTED MAY 23 1972
3,665,224
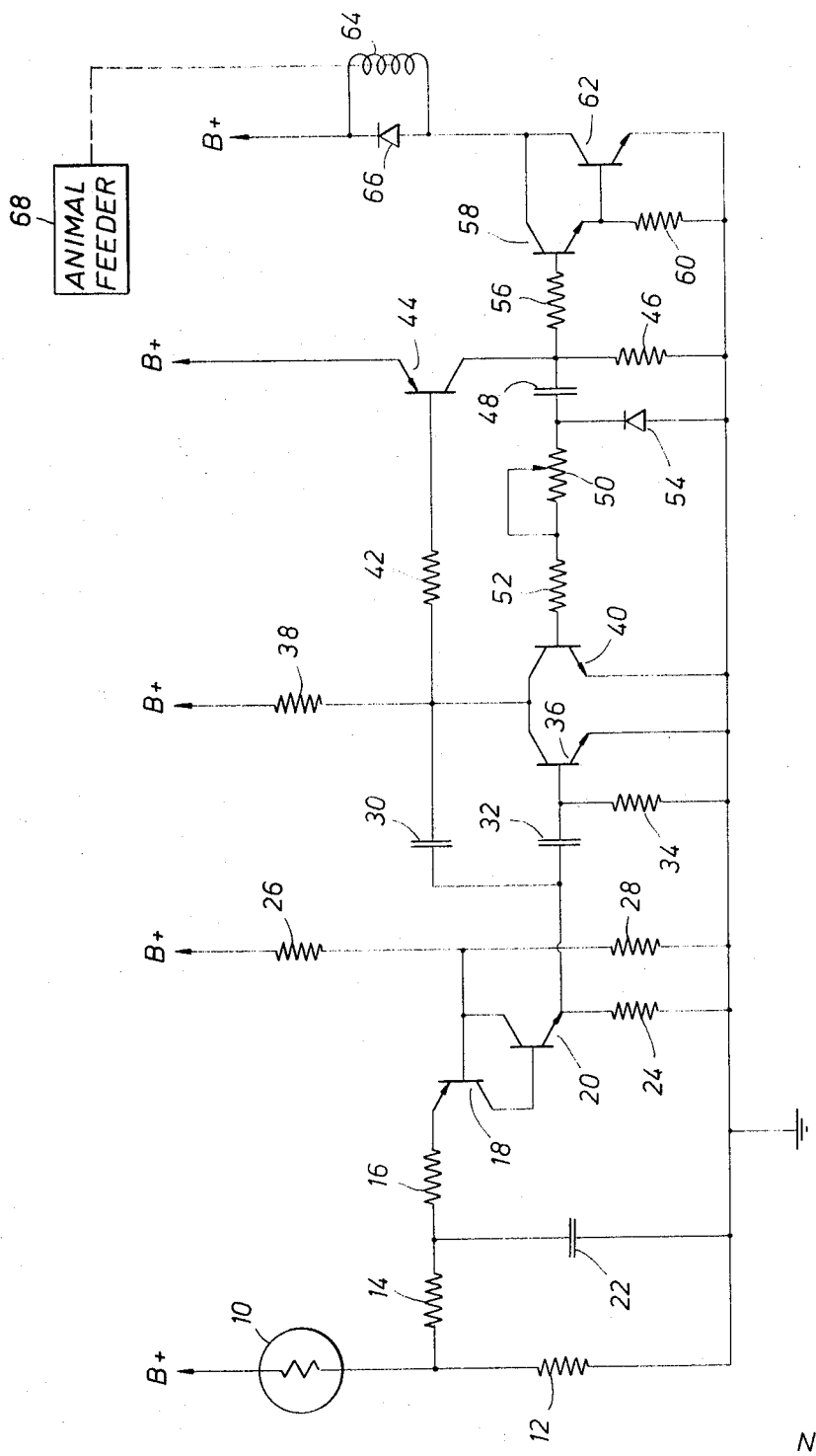
Newton D. Kelsey
INVENTOR
BY Donald Gunn
ATTORNEY

AMBIENT LIGHT LEVEL DETECTOR INCLUDING TRANSIENT SUPPRESSION CIRCUITRY

SUMMARY OF PROBLEM AND SOLUTION

The present circuit finds use in a remotely situated animal feeder. Normally, animals expect to find food about the beginning of the day and the end of the day. This is particularly true for those which are at least partially domesticated, such as flocks of birds which are fed to keep them in the vicinity of a hunting reserve or the like. The same is also true of fish feeding. At a certain time of the day, fish food will be dispensed in the water and attract a school of fish. The apparatus of the present invention is particularly useful with a remote animal feeder. The feeder utilized with the present invention incorporates a storage bin for receiving a substantial quantity of feed, a measuring device, and a dispenser. The animal feed is dispensed to a point outside the animal feeder. It may be broadcast in a circle about the feeder or dumped outwardly as in the case of a fish feeder. The food is distributed routinely and at a certain time, preferably at dawn and dusk. It should be recognized that regularity of the feeding is quite important to the health and welfare of the animals which rely on the feeding device of the present invention.

In the spring of the year, the device may be installed in the vicinity of ground nesting birds such as doves or quails to feed an entire flock, including chicks. The apparatus of the present invention is intended as a control mechanism for an animal feeder which is triggered at daylight and dark. The present invention is summarized as including a sensor which is made responsive to the rising and setting of the sun. A light sensitive resistor responds to the changes in ambient light level to operate the animal feeder cooperative with the present invention. The light sensitive resistor is included in the circuit which is connected with the level detector circuit. As the input voltage to the Schmitt trigger is altered, it assumes one of its two operative output conditions. The two conditions are determined by the light sensitive resistor in an input voltage divider connected with the level detector circuit. The Schmitt trigger is connected to an output circuit which operates a solenoid for dispensing of the feed. In between these two circuits is a time delay circuit. The time delay circuit provides an amount of delay in operation which is sufficient to overcome transients. Thus, should a person shine a flashlight on the sensor, no false signal is obtained unless the light is maintained on the device for an extended period of time. Likewise, should the sensor be temporarily covered over during the daytime, the device would not misread the temporary signal, treat it as dusk, and dispense the feeding which is normally intended for dusk. Such erratic operations are prevented through the use of the delay circuit as will be described.

Many objects and advantages of the present invention will become more readily apparent from a consideration of the following specification and drawings, which are:

The single drawing is a schematic wiring diagram of the light sensor of the present invention.

In the drawings, attention is first directed to a light sensitive resistor 10. It is connected in series with an additional resistor 12. The two are connected between ground and a source of voltage, typically the B+ supply, which is provided with the equipment. The voltage drop at the midpoint is determined by the resistance of the circuit component 10. As the amount of light falling on the resistor 10 is increased, its resistance between terminals decreases and hence, the voltage at the junction increases. The voltage at the junction between the two resistors is coupled by an additional resistor 14 through a series resistor 16 and input to a transistor 18. The transistor 18 cooperates with an additional transistor 20 to function as a level detector circuit. AC signals are grounded through the use of a grounded capacitor 22 which couples high frequency signals to ground.

The level detector circuit, including the transistors 18 and 20, has an emitter resistor 24 which is grounded. The output of the transistor 20 is formed across the resistor 24. A collector resistor is found at 26 which is connected to ground through an additional resistor 28. Considering the level detector circuit, the output signal is formed across the resistor 24. The signal is either high or low, dependent on whether or not the transistor 20 is driven to saturation. It can only assume two values. Thus, if the transistor 20 turns on slightly, a signal is provided to the base of the transistor 18 which drives it further on and which thereby returns a signal to the base of the transistor 20 which drives it to saturation. Hence, saturation is attained when the circuit is switched on, or the transistor 20 is turned off and the voltage across the resistor 24 is nearly zero. The two levels of output signals from the level detector circuit are thus coupled to the next stage, that portion of circuitry which provides a time delay.

The output of the level detector circuit circuit is taken across the resistor 24. The output is supplied to a pair of capacitors 30 and 32. The capacitors 30 and 32 have different functions depending on whether or not the device is operative at daylight or dark. More will be noted concerning this hereinafter. The capacitor 32 is grounded on one side by a resistor 34 and is input to the base of a transistor 36. The transistor 36 shares a collector resistor 38 with an additional transistor 40. The two transistors 36 and 40 are both grounded at their emitters. The common collector load resistor 38 forms signals which are transferred by a connective resistor 42 to an additional transistor 44. The transistor 44 is switched on or off by the signals supplied to the resistor 42. The transistor 44 has a collector load resistor 46. When the transistor 44 is rendered conductive, a sizeable drop across the resistor 46 is formed. This drop is coupled through a capacitor 48 to an adjustable resistor 50 and series resistor 52 back to the base of the transistor 40. A diode 54 grounds negative signals accumulated on the capacitor 48.

The delay circuit described in detail will be described in operation after its connection with an output circuit are set forth.

The delay circuit has an output signal which is formed across a resistor 46. The resistor 46 is connected through a fairly small base input resistor 56 to an emitter follower transistor 58. The emitter follower transistor 58 forms a signal across its emitter resistor 60. The emitter resistor 60 develops an output signal which is supplied to a switching transistor 62. The switching transistor 62 handles a substantial current flow for operation of a solenoid 64. When the transistor 62 switches on or off, an inductive voltage has formed in the solenoid 64, and for this reason, a diode 66 is connected across the solenoid 64. The solenoid 64 is mechanically connected to the animal feeder 68 for purposes of dispensing feed. The animal feeder is shown in application Ser. No. 56,923, filed July 21, 1970.

In operation, the resistor 10 is sensitive to the ambient light. It is preferably placed in a position to be exposed to sunlight. When it is exposed to an adequate level of light, the resistance drops toward a minimal value. Upon this occurrence, the resistor 14 couples a high level voltage to the level detector circuit. Once a threshold voltage is crossed, the level detector circuit forms a high level output across the resistor 24. When the input signal to the Schmitt trigger drops below the threshold value, a low output is formed across the resistor 24. Thus, the ambient light condition, of whatever gradation, is converted into a bilevel signal condition by the level detector circuit.

The signal from the level detector circuit is coupled through a capacitor 32. The capacitor 32 passes the leading edge of a positive going signal. For instance, this occurs at dawn when the light level on the resistor 10 increases. Considering the advent of dawn, the transistor 36 is switched on and conducts heavily. This forms a negative going signal at the collector of the transistor 36. The negative going signal is coupled to the transistor 44 which is switched on. As the transistor 44 conducts, the voltage across the resistor 46 increases. This increase in voltage is coupled back to the base of the transistor 40 through the coupling capacitor 48 and the series resistors as illustrated. The transistor is switched on. After an interval, the capacitor 48 charges up to a positive level being determined by the drop across the resistor 46. When the charge becomes sufficiently positive, it drives the base of the transistor 40 toward cut-off, and current flow is terminated through the transistor 40. This cut-off reduces current flow through the common collector resistor 38 and drives the collector voltage up, thus functioning as a monostable multivibrator and terminating the wave form which is formed by the combination of transistors 36, 40 and 44. This wave form terminates, and, so to speak, the circuit times out. This increase in current turns on the transistor 62, which is used as an electronic switch. This electronic switch connects the solenoid 64 from the positive supply to ground. This thereby permits current flow through the transistor 62 and the solenoid 64 to operate the animal feeder. Its term of operation is limited as the monostable multivibrator times out.

Timing of the monostable multivibrator is determined by the charge in the capacitor 48 and the adjustment of the resistor 50. This timing can be adjusted from perhaps a fraction of a second upwards to 8 or 10 seconds, depending on need. It functions in the same manner for both daylight and dark.

The foregoing discusses operation of the apparatus at dawn. The level detector circuit forms a positive going signal which is connected through the capacitor 32 and to the remaining portions of circuitry to cause it to function. The reverse is true at dusk. At dusk, the amount of light falling on the light sensitive resistor 10 is reduced. As the light is reduced, its resistance is increased. This inputs a low level signal to the level detector circuit which responds by switching to its lower level output. As it switches down to its lower level output, the negative going signal is coupled through the capacitor 32 to the transistor 36. However, such signal is of no avail to the operation of the transistor 36 because it is already cut-off. However, the negative going signal is connected through the additional or parallel capacitor 30 and directly to the collector of the transistor 36. This negative going signal simulates the same signal which is engendered through the operation of the transistor 36. That is, at either dawn or dusk, the collector of the transistor 36 sees a negative going signal. Hence, the time delay circuit which includes the transistors 36, 40 and 44 functions in the same manner. The only difference is that the signal at dawn is coupled through the base of the transistor 36 while the signal at dusk is connected directly to the collector of the transistor 36. Thereafter, the delay circuit functions in the same manner. The amount of delay is again determined by the cooperation of the capacitor 48, of a selected size, and the series resistor 50. Again, the output signal of the time delay circuit is developed across its resistor 46. When the transistor 44 conducts, a positive going signal is transferred to the connective resistor 56 to the emitter follower transistor 58. This, again, switches on the solenoid 64 through the use of the switching transistor 62 to operate the animal feeder 68. Both daylight and dusk function the same in the operation of the animal feeder.

Erratic light conditions are prevented from triggering the distribution of feed, such as a flash of lightening at night, through operation of the capacitor 22 which grounds transients at the input. Thus, a finite interval must pass before a change in light condition is sensed by the device.

While many alterations and variations of the present invention may be adapted, the scope of the present invention is determined by the claims which are appended hereto.

What is claimed is:

1. A circuit for detecting ambient light levels such as dawn and dusk for an animal feeder which comprises:

a light sensitive resistor means being incorporated in a voltage divider connected between two voltage levels, the midpoint thereof being connected with a level detector circuit forming an output signal at one of two levels, said level detector circuit having a predetermined threshold level;

said light sensitive resistor means being sensitive to variations of ambient light to cause said level detector circuit to form an output signal which is indicative of light levels above a certain predetermined level, and the other signal indicative of light levels below a certain predetermined level;

said level detector circuit being connected to a monostable multivibrator by means of a first coupling capacitor which is connected to the base of a transistor therein, and further including a second capacitor connected to the collector of said transistor within said monostable multivibrator;

an output circuit connected with the animal feeder for causing same to distribute animal feed; and, said monostable multivibrator being connected between said level detector circuit and said output circuit means for operating said output circuit means for a time interval which is adjustable and which initiates only after passage of a predetermined interval of light level as sensed by said light sensitive resistor means.

2. A circuit for detecting ambient light levels such as dawn and dusk for an animal feeder which comprises:

a light sensitive resistor means;

a level detector circuit means incorporating said light sensitive resistor means therein and sensitive to changes in resistance thereof as a result of variations of ambient light, said level detector circuit means forming two output signals across an output resistor, one indicative of light levels above a certain predetermined level and the other indicative of light levels below a certain predetermined level;

a pair of capacitor means connected with said output resistor;

a first transistor switch means connected to one of said capacitor means at its base;

said transistor means including a collector which is connected to the second capacitor means, said means further including a load resistor through which current is developed by said transistor means when it is switched on and off;

additional circuit means connected to said transistor means for controlling the interval of time the voltage level at the collector of transistor means is maintained at a level initiated by a signal from said level detector circuit means initiated by a signal from said level detector circuit means coupled through one of said capacitor means;

an output circuit connected with the animal feeder for causing same to distribute animal feed; and, said transistor means being connected to said output circuit means for operating said output circuit means for a time interval which is adjustable and which initiates only after passage of a predetermined interval of light level as sensed by said light sensitive resistor means.

* * * * *